US012300115B1

(12) United States Patent
Sahasrabudhe et al.

(10) Patent No.: US 12,300,115 B1
(45) Date of Patent: May 13, 2025

(54) COMPUTER-IMPLEMENTED TASK COMPLETION PLATFORM FOR VISUALLY IMPAIRED STUDENTS

(71) Applicant: Educational Testing Service, Princeton, NJ (US)

(72) Inventors: Shrirang Prakash Sahasrabudhe, Princeton, NJ (US); Sindhura Jaladhanki, Princeton, NJ (US); Markku Tapio Hakkinen, Lawrenceville, NJ (US); Thomas Florek, Lambertville, NJ (US); Dolores Marie Dyer, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 0 days.

(21) Appl. No.: 18/149,691

(22) Filed: Jan. 4, 2023

Related U.S. Application Data

(60) Provisional application No. 63/296,521, filed on Jan. 5, 2022.

(51) Int. Cl.
*G06F 3/0482* (2013.01)
*G09B 21/00* (2006.01)

(52) U.S. Cl.
CPC ......... *G09B 21/008* (2013.01); *G06F 3/0482* (2013.01)

(58) Field of Classification Search
CPC ............................................... G06F 3/048–05
See application file for complete search history.

(56) References Cited

U.S. PATENT DOCUMENTS

| 2002/0156632 | A1* | 10/2002 | Haynes | G09B 17/003 704/270 |
| 2006/0074636 | A1* | 4/2006 | Xu | G06F 40/40 704/10 |
| 2009/0017432 | A1* | 1/2009 | Hoffmann | G09B 7/06 434/350 |
| 2011/0197124 | A1* | 8/2011 | Garaventa | G06F 16/972 715/234 |
| 2013/0244217 | A1* | 9/2013 | Potts | G09B 5/125 434/324 |

(Continued)

OTHER PUBLICATIONS itslearning.com, "Toets-Vraagtypen", archived in « https://web.archive.org» on Jun. 17, 2021, available at « https://support.itslearning.com/nl/support/solutions/articles/7000030446-toets-vraagtypen», 9 pages (Year: 2021).*

(Continued)

*Primary Examiner* — Daniel Rodriguez
(74) *Attorney, Agent, or Firm* — Jones Day

(57) ABSTRACT

An ordered interaction task is initiated in a graphical user interface. A main region of the graphical user interface is segmented into a plurality of discrete sub-regions, each sub-region including content of the ordered interaction task. The user is then prompted to begin the ordered interaction task through a non-visual prompt that is provided concurrently with the graphical user interface. In response to a first user-initiated command received in the graphical user interface, a non-visual presentation of at least a portion of the content of at least one sub-region is provided concurrently with the graphical user interface.

21 Claims, 16 Drawing Sheets

(56) References Cited

U.S. PATENT DOCUMENTS

| | | | | |
|---|---|---|---|---|
| 2014/0356838 | A1* | 12/2014 | Freimuth | G09B 7/02 |
| | | | | 434/348 |
| 2015/0206445 | A1* | 7/2015 | Modde | G09B 5/06 |
| | | | | 434/362 |
| 2015/0301721 | A1* | 10/2015 | Clark | G06F 40/42 |
| | | | | 715/780 |
| 2017/0286390 | A1* | 10/2017 | Yashpe | G06F 40/253 |
| 2017/0287356 | A1* | 10/2017 | Stephen | G09B 7/06 |
| 2018/0240363 | A1* | 8/2018 | Vats | G06F 1/1637 |
| 2020/0401646 | A1* | 12/2020 | Brunet | G06F 16/9574 |
| 2023/0144009 | A1* | 5/2023 | Andersen | G06F 40/14 |
| | | | | 715/237 |
| 2023/0162619 | A1* | 5/2023 | Kantar | A63F 13/28 |
| | | | | 434/112 |

OTHER PUBLICATIONS utwente.graasp.eu, "Fill in The Blanks", archived in « https://web.archive.org» on Jul. 29, 2021, available at « https:// utwente.graasp.eu/production/fillIn TheBlanks/build/fillInTheBlanks.html?context=preview», 6 pages (Year: 2021).*

Jesse Hausler, "4 Major Patterns for Accesible Drag and Drop", published on Nov. 1, 2017, available at « https://utwente.graasp.eu/production/fillIn TheBlanks/build/fillInTheBlanks.html?context=preview», 31 pages. (Year: 2017).*

Emilie Berglund et al., "Accessible and User-Friendly Drag-and-Drop Questions", available on Nov. 20, 2019, available at « Accessible and User-Friendly Drag-and-Drop Questions", available Nov. 20, 2019, hereinafter"Berglund», 36 pages (Year: 2019).*

* cited by examiner

COMPUTER-IMPLEMENTED TASK COMPLETION PLATFORM FOR VISUALLY IMPAIRED STUDENTS

CROSS-REFERENCE TO RELATED APPLICATION

This application claims priority to U.S. Provisional Patent Application No. 63/296,521 filed Jan. 5, 2022, the entirety of which is hereby incorporated by reference.

FIELD

The technology described in this patent document relates generally to accessibility in test taking, and, more particularly, to providing visually-impaired students an equivalent to drag and drop interactions.

BACKGROUND

In recent years, computer-based testing has increasingly replaced traditional paper and pencil assessments. A common task type in digital assessments requires a test taker to place a set of elements in a particular order. These tasks are commonly implemented through a drag and drop interaction, in which the test taker selects one of the elements and drags it, using a mouse or touch screen, into a desired position. For example, language learning assessments often include sentence completion tasks utilizing a drag and drop interaction.

In a drag and drop sentence completion task, a prompt appears on a screen, followed by a sentence with one or more blanks representing missing words. Beneath the sentence will be two or more words representing possible solutions that would complete the sentence. A test taker then drags the words into the blanks to formulate the sentence.

Drag and drop interactions are seen by designers as an intuitive and easy to operate task for most learners. However, drag and drop interactions are generally seen as not accessible or usable for students with disabilities, specifically those who are visually-impaired and utilize screen readers. While efforts have been made to address accessibility shortcomings in drag and drop interactions, there are no standard approaches.

A twinning approach is often used to accommodate test takers with disabilities. In this type of approach, an alternate version of the assessment is created and administered to those who cannot access or use the original version. For example, in the sentence completion task discussed above, this could involve creating a multiple choice test wherein the test taker chooses from a list of possible answers for each blank, rather than through a drag and drop interaction. The twinning approach allows students with disabilities to take a version of the test, but it comes with significant drawbacks. Twinning is often seen as a separate and potentially unequal solution to the problem, raising ethical and equity concerns. Additionally, the practice of twinning requires test makers to expend time and resources creating multiple versions of a single test. Further, a twinning approach in this context deprives students with disabilities of the more intuitive drag and drop interaction that is available to other test takers.

SUMMARY

In one aspect, an ordered interaction task which is to be completed by a user is initiated in a graphical user interface. Thereafter, a main region of the graphical user interface is segmented into a plurality of discrete sub-regions which include content of the ordered interaction task. The user is then prompted to begin the ordered interaction task via a non-visual prompt that is provided concurrently with the graphical user interface. In response to a first user-initiated command received in the graphical user interface, a non-visual presentation of at least a portion of the content of at least one sub-region is provided concurrently with the graphical user interface.

The plurality of sub-regions may include at least a directions region, a question region, and a response region comprised of a choice region and a target region. The choice region includes a plurality of elements to be placed in order by the user. The target region comprises a plurality of blanks. The blanks of the target region are capable of being in either a filled state, wherein an element of the choice region is filled into the blank, or an un-filled state. The target region and the choice region are configured such that, in response to additional user-initiated commands, elements of the choice region are moved from the choice region into un-filled blanks of the target region to create filled blanks, elements of filled blanks of the target region are moved into the choice region to create un-filled blanks, and elements of filled blanks are replaced by elements of the choice region or elements of other unfilled blanks.

In an aspect, the first user-initiated command selects an element of the plurality of elements of the choice region, and the non-visual presentation comprises non-visual presentation of the selected element. In a response to a second user-initiated command, a filled blank is created by filling an un-filled blank of the target region with the selected element. Thereafter, a second non-visual presentation comprising non-visual presentation of the filled blank is provided concurrently with the graphical user interface. The second non-visual presentation indicates a position of the filled blank with respect to other blanks of the target region. The filled blank can then be selected in response to a third user-initiated command, and the element moved from the filled blank back into the choice region in response to a fourth user-initiated command.

The ordered interaction task can be a sentence completion task in which the elements of the choice region are words that make up a sentence to be complete, and the blanks of the target region represent positions of the words within the sentence.

In such an aspect, a third non-visual presentation is provided concurrently with the graphical user interface in response to another user-initiated command. The third non-visual presentation comprises non-visual presentation of a status of the sentence, which includes static text and the content of the target region.

Attributes of the graphical user interface may be captured using a screen reader, and the non-visual presentation can be provided via the screen reader.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter can be used to create ordered interaction tasks in a single implementation that can be used by both sighted and visually-impaired individuals. This provides visually-impaired users with a more intuitive interaction than previous approaches and saves task creators time and resources ordinarily expended to create multiple versions of the same task.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to computer-implemented techniques for providing various task completion problems to a user in a graphical user interface. In some implementations, the task completion problem can be an ordered interaction task. In particular, the current subject matter is directed to providing such tasks in a manner accessible to visually-impaired users. To do so, the techniques described herein make use of Accessible Rich internet Applications (ARIA). ARIA is a set of attributes that can be added to HTML elements in order to make web content and applications accessible to users of assistive technologies. By implementing ARIA in the task completion problems, users are able to interact with the information provided via the graphical user interface.

As used herein "ordered interaction task" refers to any test, assessment, or the like in which a user is asked to place elements into a specified order. The examples described herein relate to a sentence completion task, but it is noted that this is non-limiting, and the methods and systems of the current subject matter may be used to implement other ordered interaction tasks. For example, a user could be asked to place historical events in order of when they occurred. Another non-limiting example could ask users to place numbers and mathematical operators in a correct order to create an equation.

As used herein, "non-visual presentation" refers to presentation of information in any manner other than visually. The examples described herein discuss audio output of information. However, the current subject matter is not so limited. For example, non-visual presentation could be provided through a braille display, haptic feedback, or equivalents thereof.

Figure 1:
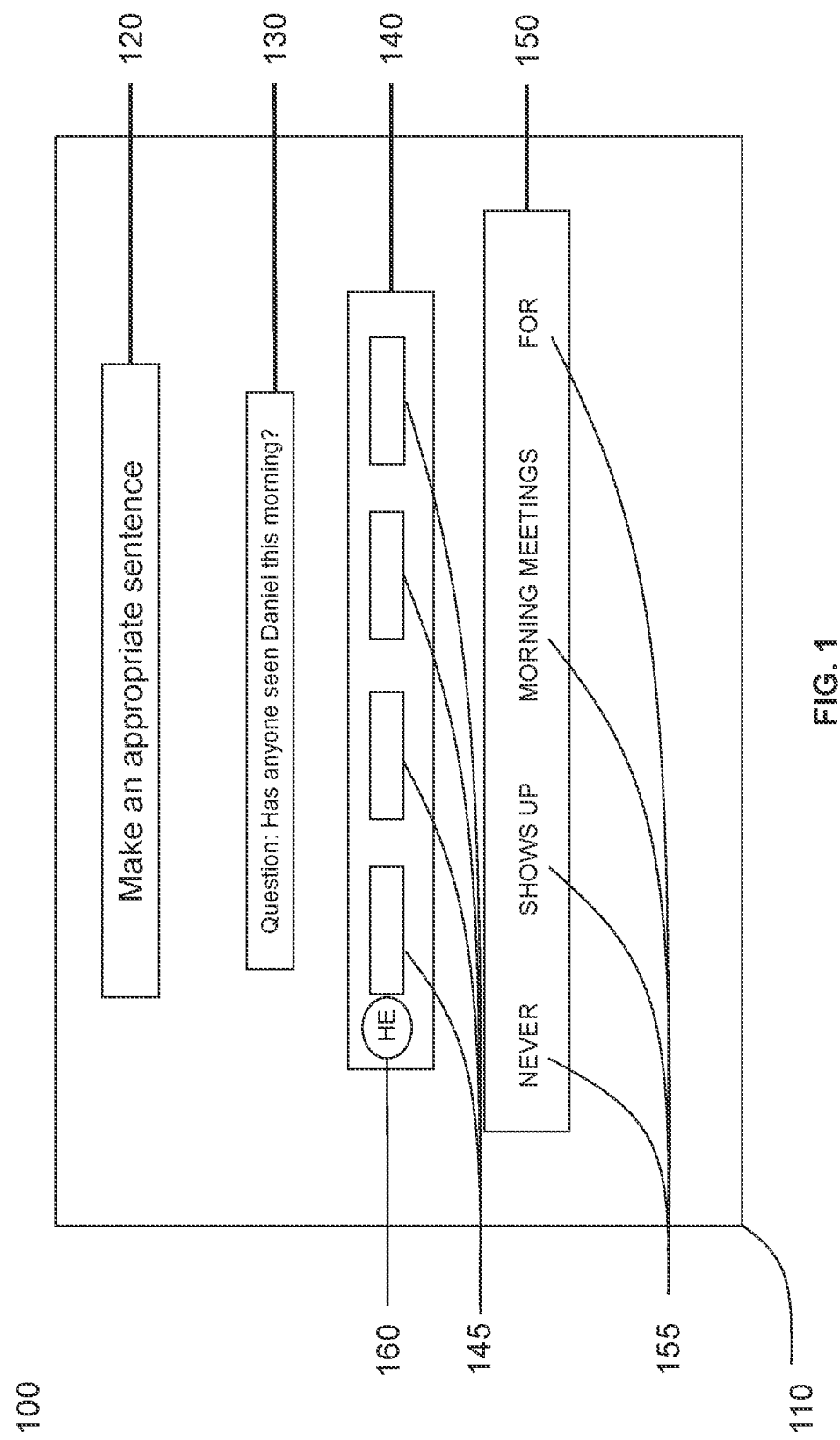
FIG. 1 depicts an example of an ordered interaction task.

FIG. 1 depicts of an exemplary ordered interaction task 100 as it appears on a graphical user interface (GUI). The GUI can be rendered locally on a client device in a resident application or it can be rendered in a browser executing a remote application or service. The GUI includes a main region 110 including content of the ordered interaction task. Within the main region 110, the GUI further includes a plurality of discrete sub-regions. These sub-regions include a directions region 120, a question region 130, a target region 140, and a choice region 150. Together, the target region 140 and choice region 150 make up a response region in which a user interacts with content of the ordered interaction task. A plurality of blanks 145 and static text 160 are provided in the target region 140. A plurality of elements 155 are provided in the choice region 150.

The plurality of blanks 145 are capable of existing in either a filled or an un-filled state. The blanks 145 shown in FIG. 1 are in an un-filled state. In the un-filled state, blanks operate as placeholders for the completed ordered interaction task. In the filled state, the space within the blanks is occupied by an element of the choice region. The target region and the choice region are configured such that a user can select and move elements from the choice region into un-filled blanks, and can select elements with filled blanks and move them back to the choice region. Additionally, a user can select an element from a filled blank and move it into an un-filled blank.

In FIG. 1, the ordered interaction task 100 is a sentence completion task. In such a task, the directions region 120 includes an instruction for the user to "make an appropriate sentence." The question region 130 poses an example question that the user is required to answer in making an appropriate sentence. Here the question is "Has anyone seen Daniel this morning?" The static text 160 of the target region 140 provides the user with a start to the sentence, and in this case includes the word "he." Words or short phrases that finish the appropriate sentence are provided as the elements 155 of the choice region 150. In this case, the provided elements are "never," "shows up," "morning meetings," and "for." It is up to the user to put these in order, along with the static text, to make a sentence that is an appropriate response to the question "has anyone seen Daniel this morning."

The ordered interaction task 100, as shown in FIG. 1, may be provided to both those with and without visual impairments. The non-visually impaired may interact with the information provided in the GUI through a drag and drop interaction such that test takers can drag elements 155 of the choice region 150 into blanks 145 of the target region 140 using a mouse, a touch screen, or the like. The advantage of the current subject matter is that this same ordered interaction task 100 can be presented in a non-visual manner to those having visual impairments. Exemplary systems and methods for accomplishing this are described below.

Figure 2A:
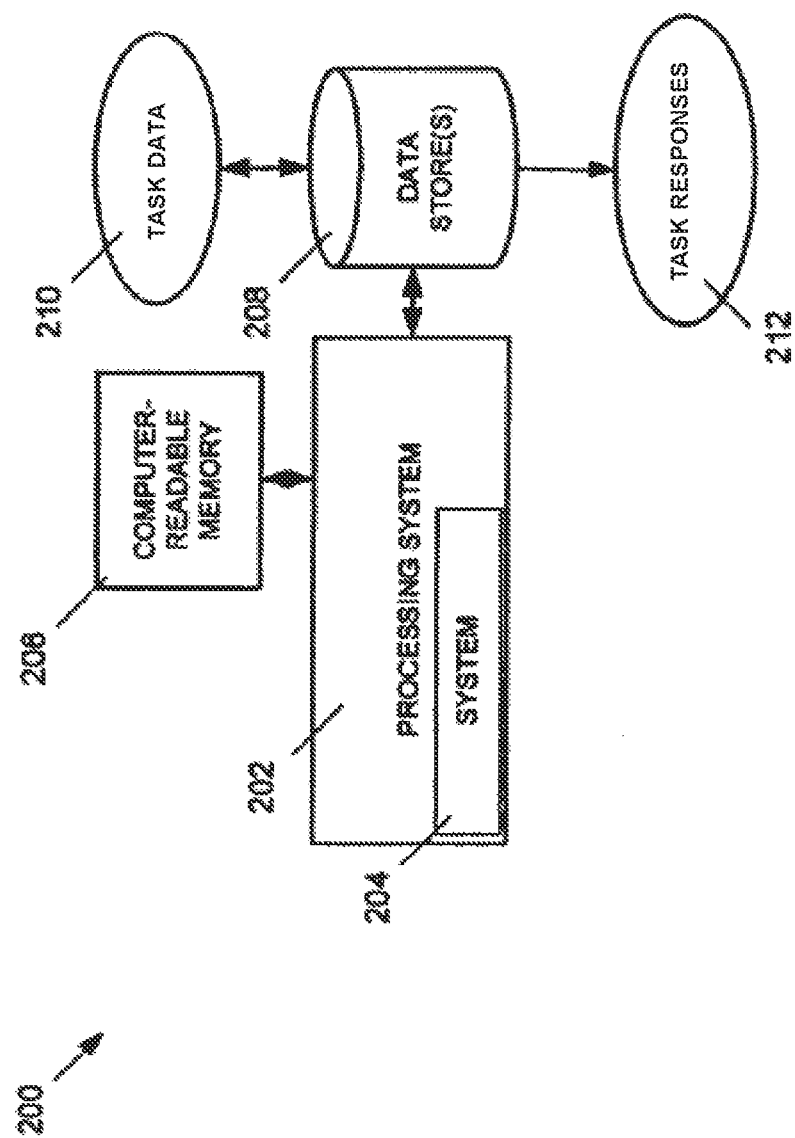
FIGS. 2A, 2B, and 2C depict example computer-implemented systems for providing an ordered interaction task.
Figure 2B:
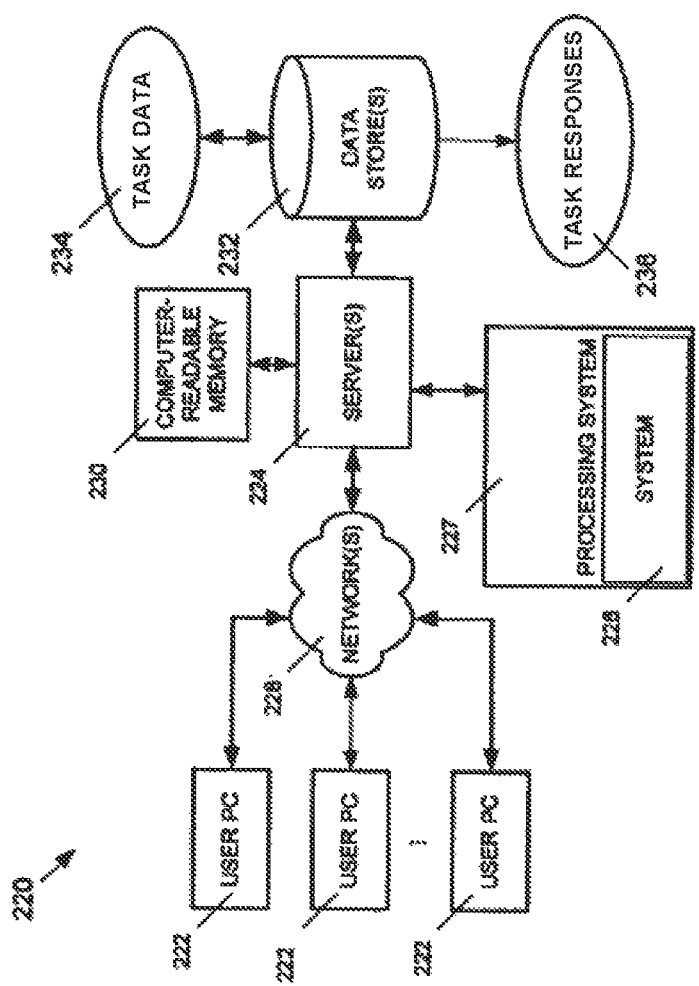
Figure 2C:
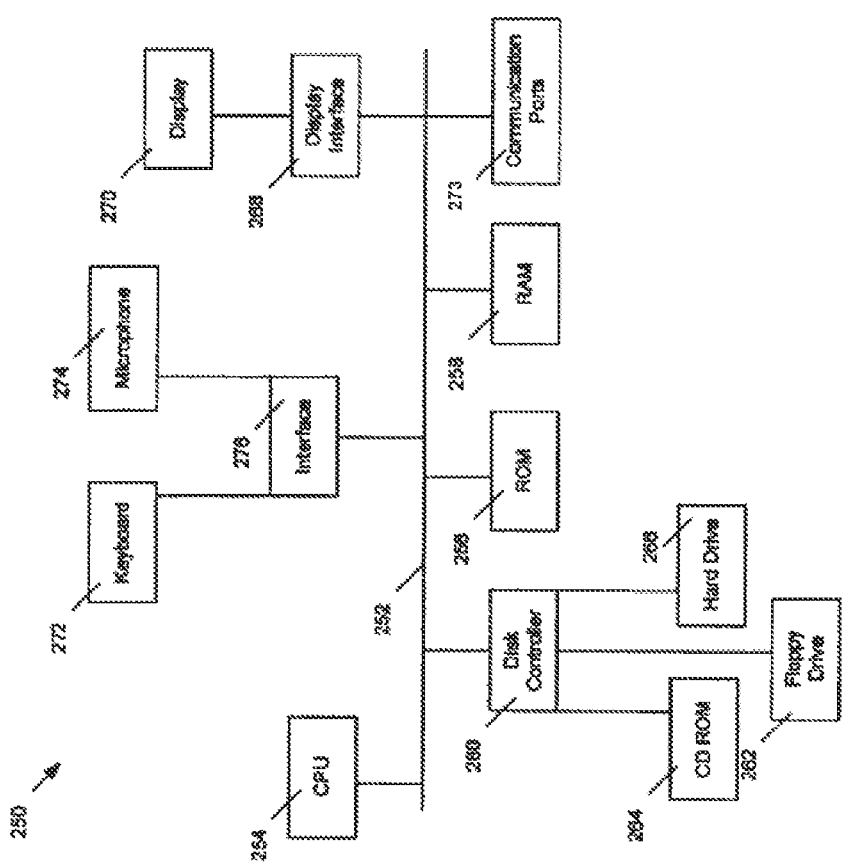

FIGS. 2A, 2B, and 2C depict example computer-implemented systems for use in providing an ordered interaction task. For example, FIG. 2A depicts an exemplary system computer-implemented system 200 that includes a stand-alone computer architecture where a processing system 202 (e.g., one or more computer processors) includes a system 204 being executed on it. The processing system 202 has access to a non-transitory computer-readable memory 206 in addition to one or more data stores 208. The one or more data stores 208 may contain task data 210 as well as task responses 212.

FIG. 2B depicts a system 220 that includes a client server architecture. One or more user PCs 222 accesses one or more servers 224 running a system 226 on a processing system 227 via one or more networks 228. The one or more servers 224 may access a non-transitory computer readable memory 230 as well as one or more data stores 232. The one or more data stores 232 may contain task data 234 as well as task responses 236.

FIG. 2C shows a block diagram of exemplary hardware for a standalone computer architecture 250, such as the architecture depicted in 2A, that may be used to contain and/or implement the program instructions of system embodiments of the current subject matter. A bus 252 may serve as the information highway interconnecting the other illustrated components of hardware. A processing system 254 labeled CPU (central processing unit) (e.g., one or more computer processors), may perform calculations and logic operations required to execute a program. A non-transitory computer-readable storage medium, such as read only memory (ROM) 256 and random access memory (RAM) 258, may be in communication with the processing system 254 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 250 interfaces one or more optional disk drives to the system bus 252. These disk drives may be external or internal floppy disk drives such as 262, external or internal CD-ROM, CD-R, CD-RW, DVD or solid state drives such as 264, or external or internal hard drives 266. In addition to physical drives, the system bus 252 may be in communication with cloud-based virtual drives. As indicated previously, these various drives and disk controllers are optional devices.

Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258. Preferably, the processor 254 may access each component as required.

A display interface 268 may permit information from the bus 252 to be displayed on a display 270 in audio, graphic, or alphanumeric format. Communication with external devices may optionally occur using various communication ports 273. In addition to the standard computer-type components, the hardware may also include data input devices, such as a keyboard 272, or other input device 274, such as a microphone, remote control, pointer, mouse and/or joystick. These components can be coupled to the bus 252 via an interface 276. In exemplary methods and systems described herein, ordered interaction tasks provide graphic display concurrently with non-visual presentation of the information. The non-visual presentation may be provided in audio format via the display 270 and a program that uses text-to-speech (TTS) synthesis. Additionally, the non-visual presentation may be provided via an external device in communication with the system via communication ports 273. As non-limiting examples, an external screen reader may provide an audio presentation, or a braille display may provide a tactile presentation.

Figure 3:
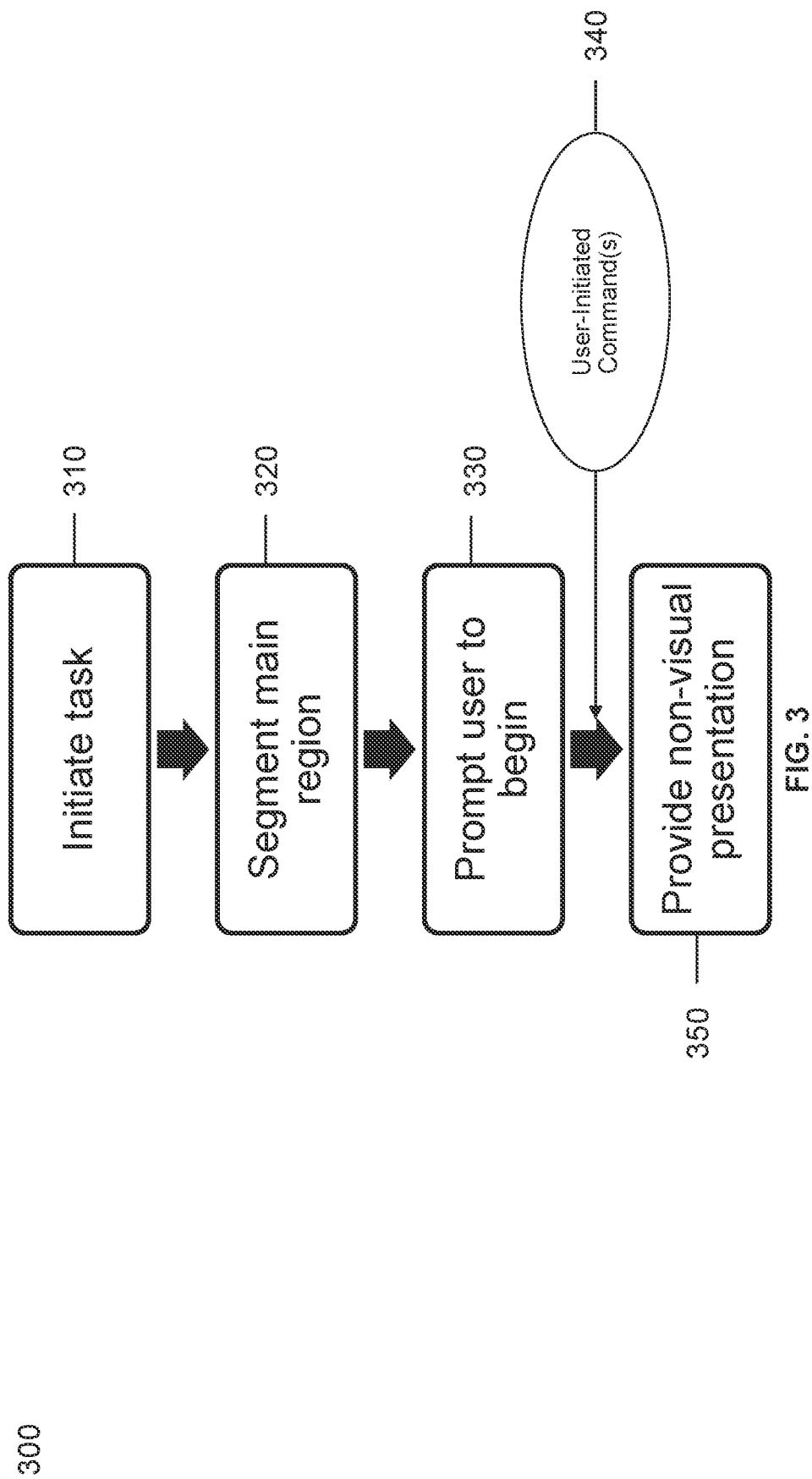
FIG. 3 is a process flow diagram illustrating a computer-implemented process for task completion that can be used by visually impaired students.
Figure 4:
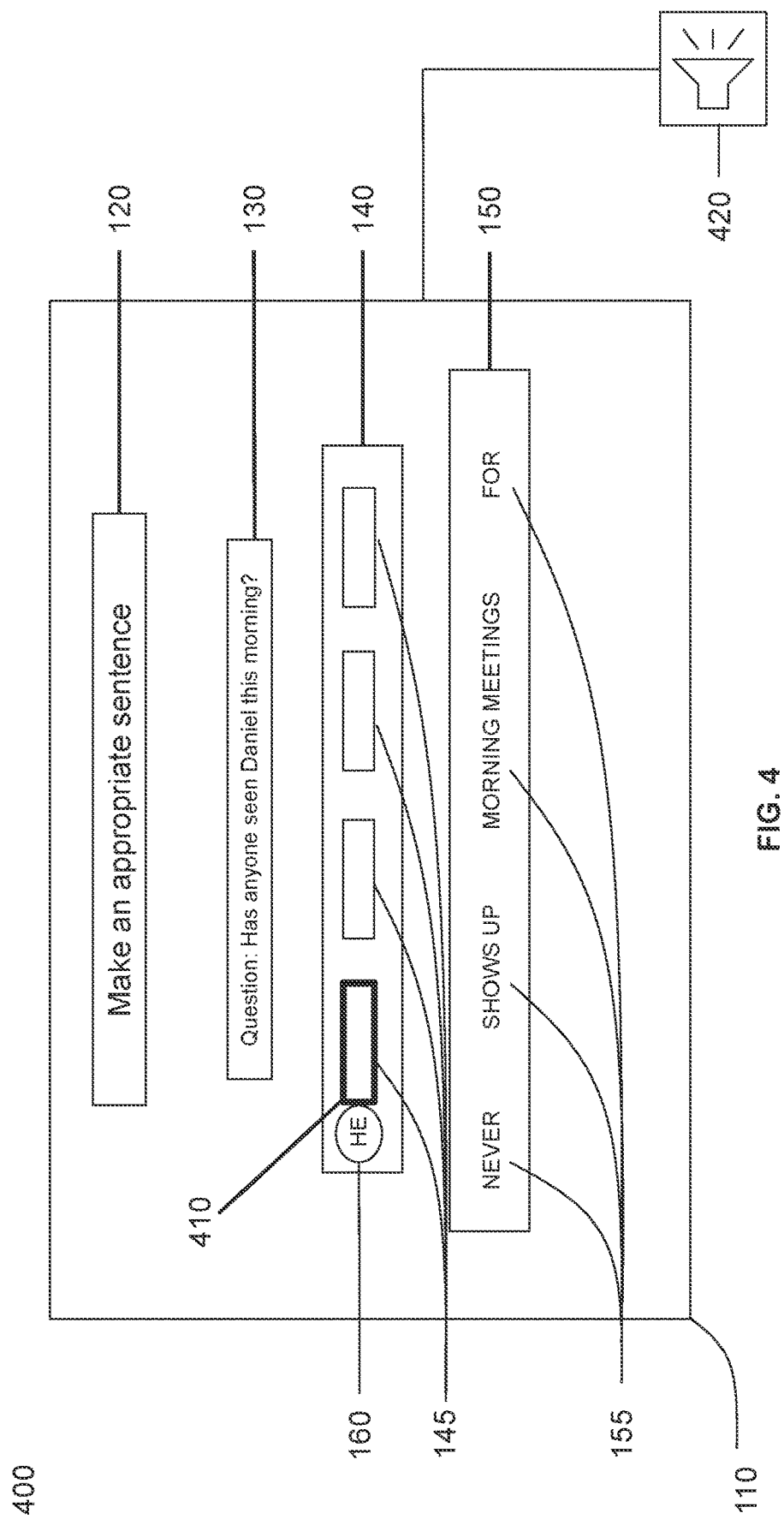
FIGS. 4-6 depict an ordered interaction task in various states according to a first aspect.

FIG. 3 depicts a flowchart 200 showing a computer-implemented method according to an embodiment of the current subject matter. In describing the method, reference will be made to FIG. 3 as well as FIGS. 4-6, which depict the ordered interaction task in various states of the method. The method begins in block 310 of FIG. 3 by initiating an ordered interaction task in the GUI. FIG. 4 shows an ordered interaction task in a first state 400 occurring after initiation. The ordered interaction task 400 in FIG. 4 is the same as that in FIG. 1, but represents how the task exists in the GUI in the first state 400 subsequent to initiation. Reference numbers in FIG. 4 that are the same as those in FIG. 1 are understood to represent the same features.

In block 320 of FIG. 3, upon initiation of the task, the main region of the ordered interaction task is segmented into sub-regions. As shown in FIG. 4, main region 110 is segmented into directions region 120, question region 130, target region 140, and choice region 150. This segmenting is accomplished by assigning ARIA roles to each sub-region. In particular the ARIA landmark role "region" is assigned to each sub-region in order to identify each sub-region as significant such that each sub-region is readily discoverable and navigable.

Within the target region 140, each blank is further assigned a specified number according to its position from left to right in the GUI. The blank furthest to the left is identified as "blank one" the next blank is identified as "blank two" and that patterns continues for each blank of the target region 140.

In block 330 of FIG. 3, the user is prompted to begin the ordered interaction task. For sighted users, the GUI visibly displays the content of the question region, prompting the user to "make an appropriate sentence." As depicted in FIG. 4, concurrently with this visual display, a non-visual prompt 420 is provided to visually-impaired users via a screen reader or similar means. In the embodiment described herein, the non-visual prompt is an audio presentation of the content of the question region 120. Upon initiation, a visually-impaired user will hear the phrase "make an appropriate sentence," prompting the user to begin the task.

At this point the user can interact with the GUI and navigate through the content of the ordered interaction task via user-initiated commands. These user-initiated commands may be input to the GUI through a keyboard. For example, a user may use the keyboard to navigate between and within sub-regions. As the user navigates through the GUI with the keyboard, a user receives non-visual presentations so that alert the user of their current position within the GUI. As such, on a first pass-through of the GUI, a user would first use the keyboard to move from the directions region 120 to the question region 130. At this point, a visually-impaired user will hear the phrase "question: has anyone seen Daniel this morning?" The user could then continue to navigate through the GUI with the keyboard.

In the state depicted in FIG. 4 a user has navigated to a first un-filled blank of the target region 140. This is indicated by the highlighted box 410. When the user reaches an un-filled blank, the user is directed, via a non-visual presentation, to "please select a choice first." This instruction will direct the user to continue navigating through the sub-regions until they reach the choice region 150 and can evaluate the elements 155 therein.

Figure 5:
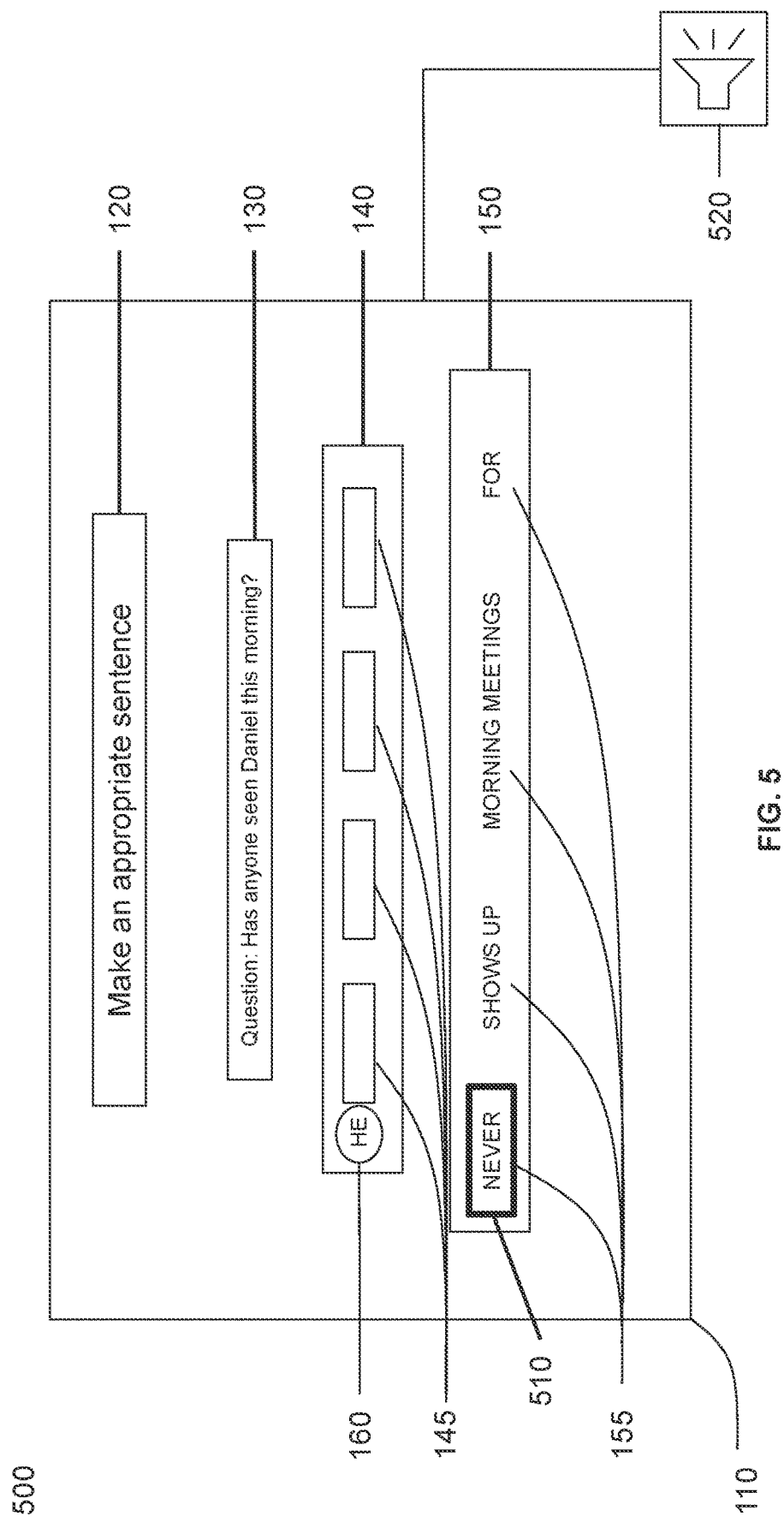

FIG. 5 shows the ordered interaction task in a second state 500 after further navigation by a user. In this state, the user has continued to navigate through the GUI to arrive at the choice region. This is indicated by the highlighted box 510. The user, at this point, receives a non-visual presentation of the element. The user then has the option to select this element via an additional user-initiated command. For example, by pressing the space bar, or enter key, the first element of the choice region may be selected. Upon selection, the user receives a non-visual presentation 520 of the element selected. In the case of FIG. 5, the user would hear the phrase "never selected." The user can then use the keyboard to navigate back through the sub-regions to the target region in order to place the selected element into a desired blank. As with the first pass-through, as the user navigates through the sub-regions, non-visual presentations are provided to orient the user within the GUI. For each blank, the non-visual presentation includes the number associated with the blank. For example, as the user navigates to the second blank, the user receives a non-visual presentation of the phrase "blank two."

Figure 6:
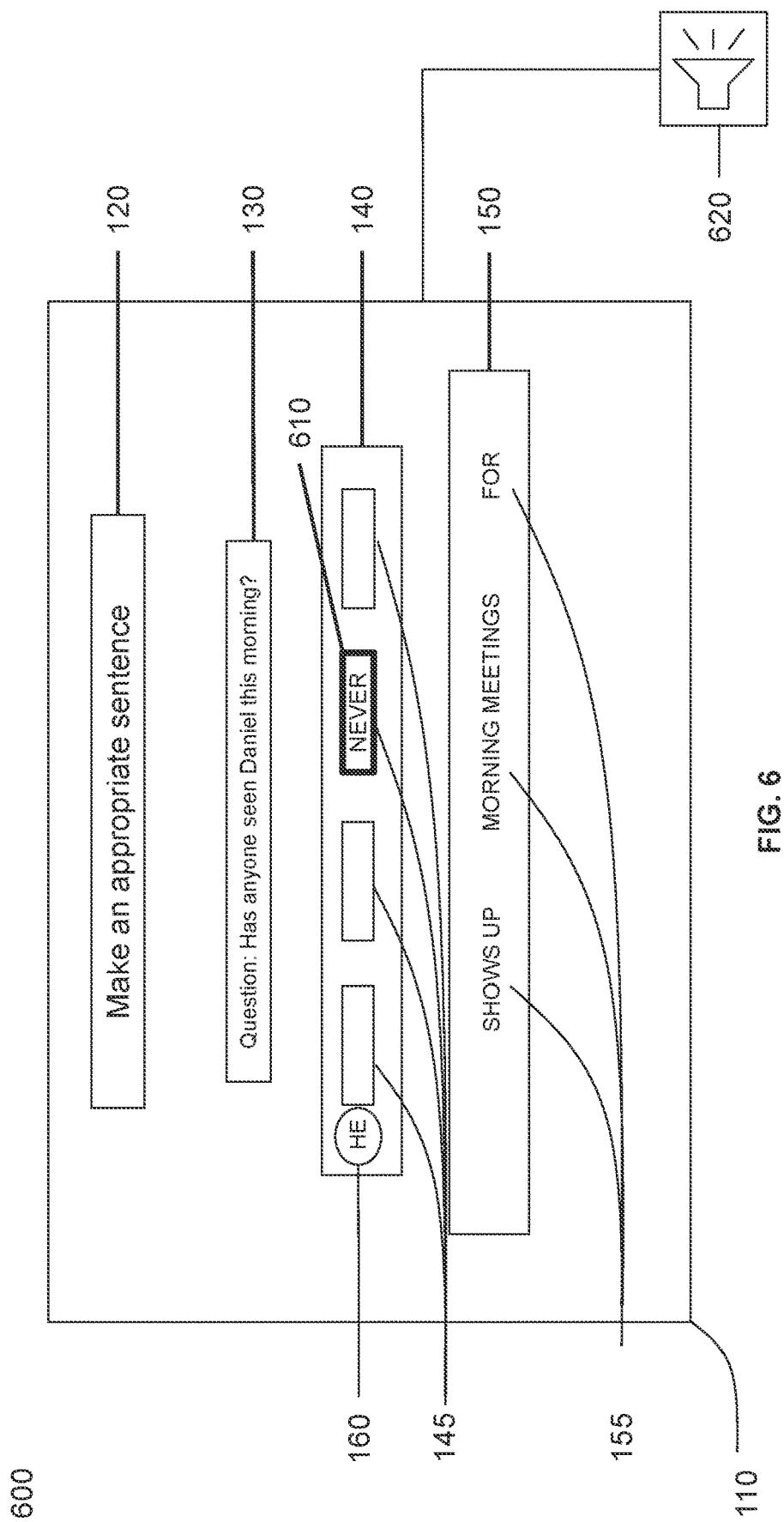

FIG. 6 shows the ordered interaction task in a third state 600 after additional navigation and user-initiated commands. In this state, the user has navigated to the third blank of the target region and elected to insert the selected element into the third blank via a user-initiated command. For example, the user may press the space bar or enter key to insert the element into the third blank. This is indicated by the highlighted box 610. After inserting the element into the blank, the user is provided with a non-visual presentation 620 describing the action. Here, the user would hear the phrase "never inserted in blank three."

In addition to selecting choice elements and inserting them into un-filled blanks, methods and systems provided herein also allow for choice elements to be removed from filled blanks and returned to the choice region. This action will be described with reference to FIG. 7 and FIG. 8.

Figure 7:
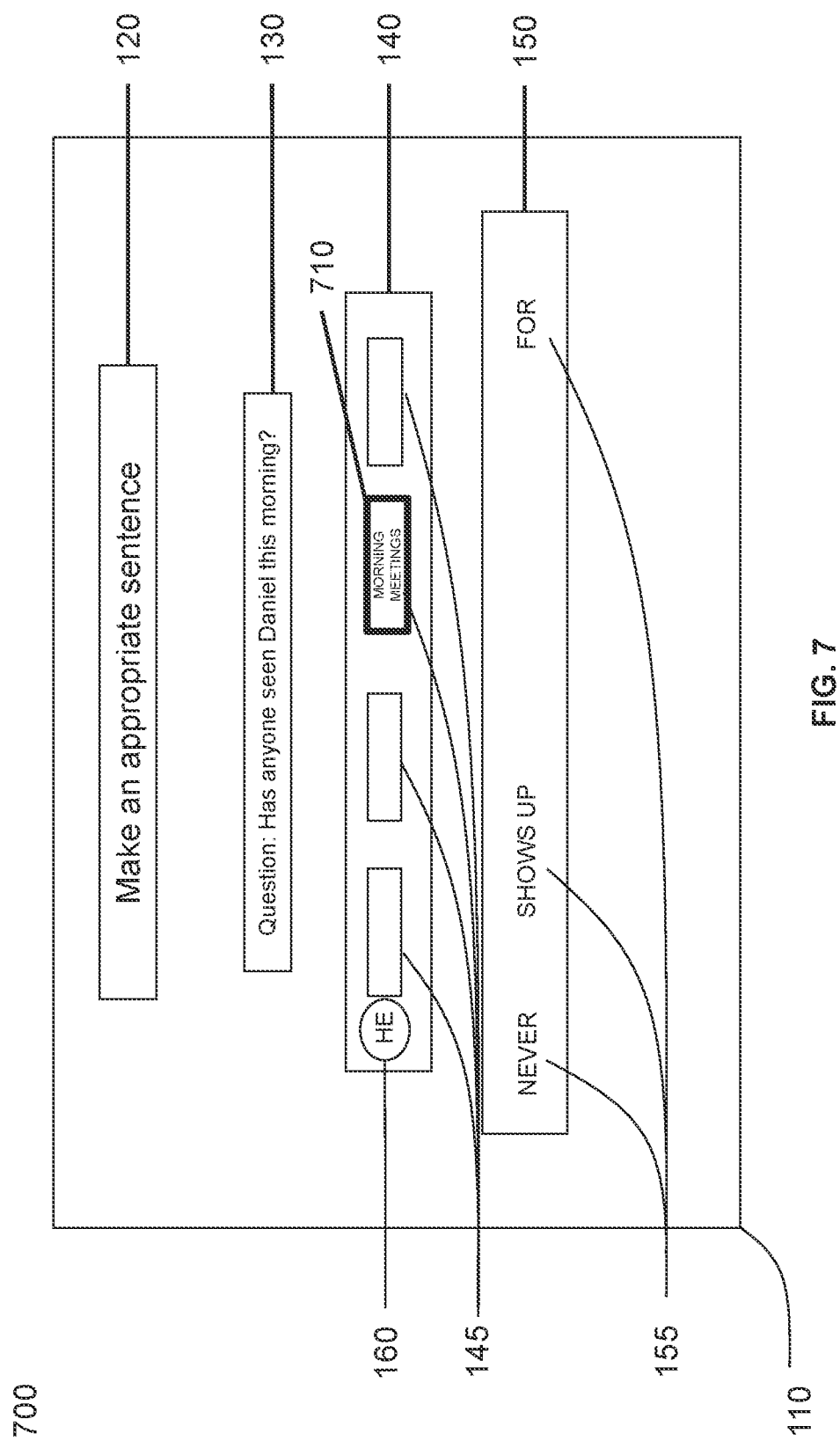
FIGS. 7-8 depict an ordered interaction task in various states according to a second aspect.
Figure 8:
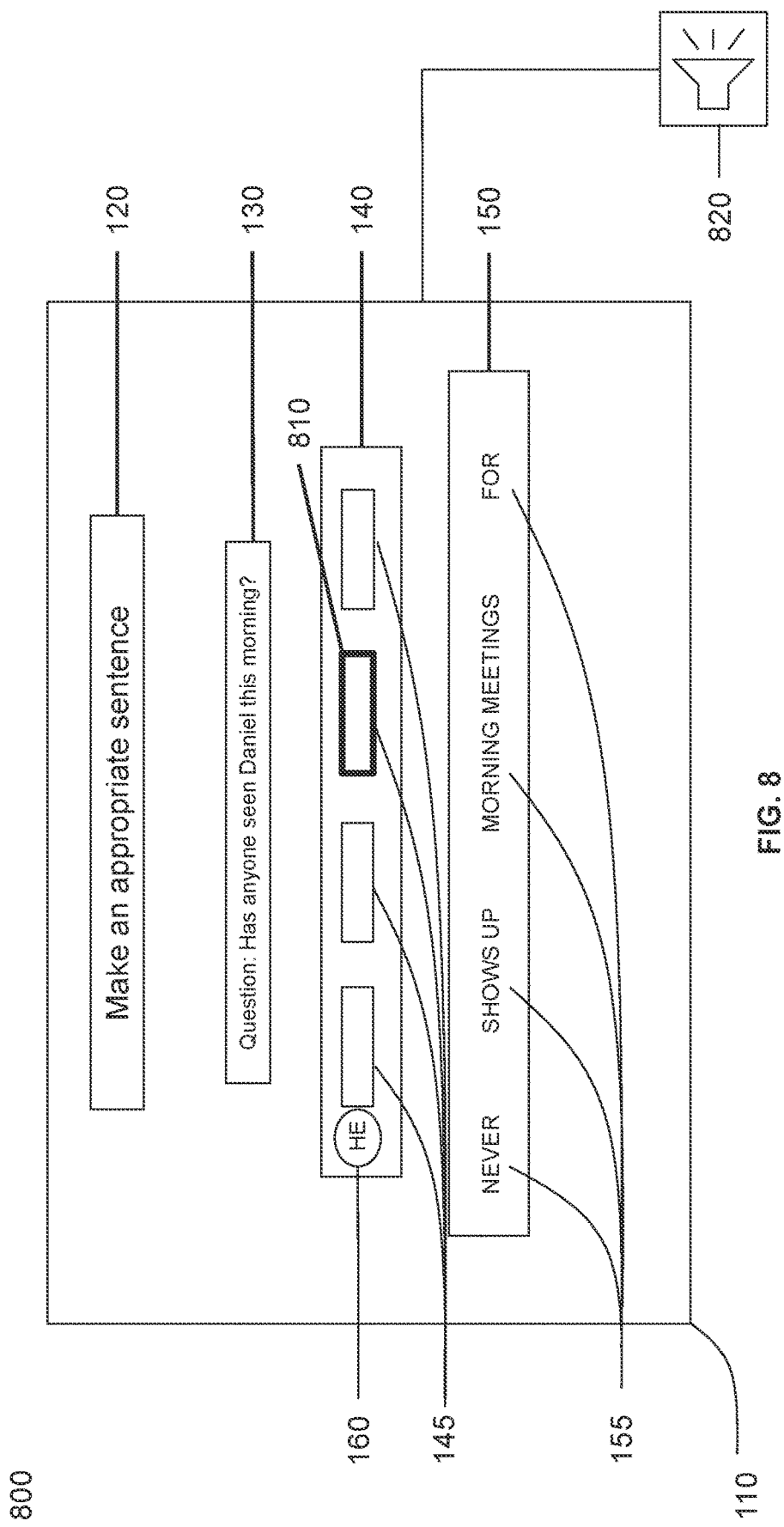

FIG. 7 shows the GUI showing the ordered interaction task in an additional state 700. In this state, the user has inserted the element "morning meetings" into the third blank. However, the user has realized that this insertion was in error and desire to remove the element from the blank. To do so, the user has used the keyboard to navigate to the third blank, and select the element as indicated by the highlighted box 710. The user can then remove the choice from the filled blank by inputting another user-initiated command. For example, by pressing the space bar or enter on the filled blank, the user can return the element to the choice region 150. FIG. 8 depicts the GUI showing the ordered in action in another state 800 following this return. As depicted, the element "morning meetings" has been returned to the choice region 150, and the filled blank has become an un-filled blank as indicated by the highlighted box 810. After the removal, the user receives a non-visual presentation 820 describing the action. Here, the user would hear the phrase "morning meetings returned to the choice region."

Figure 9:
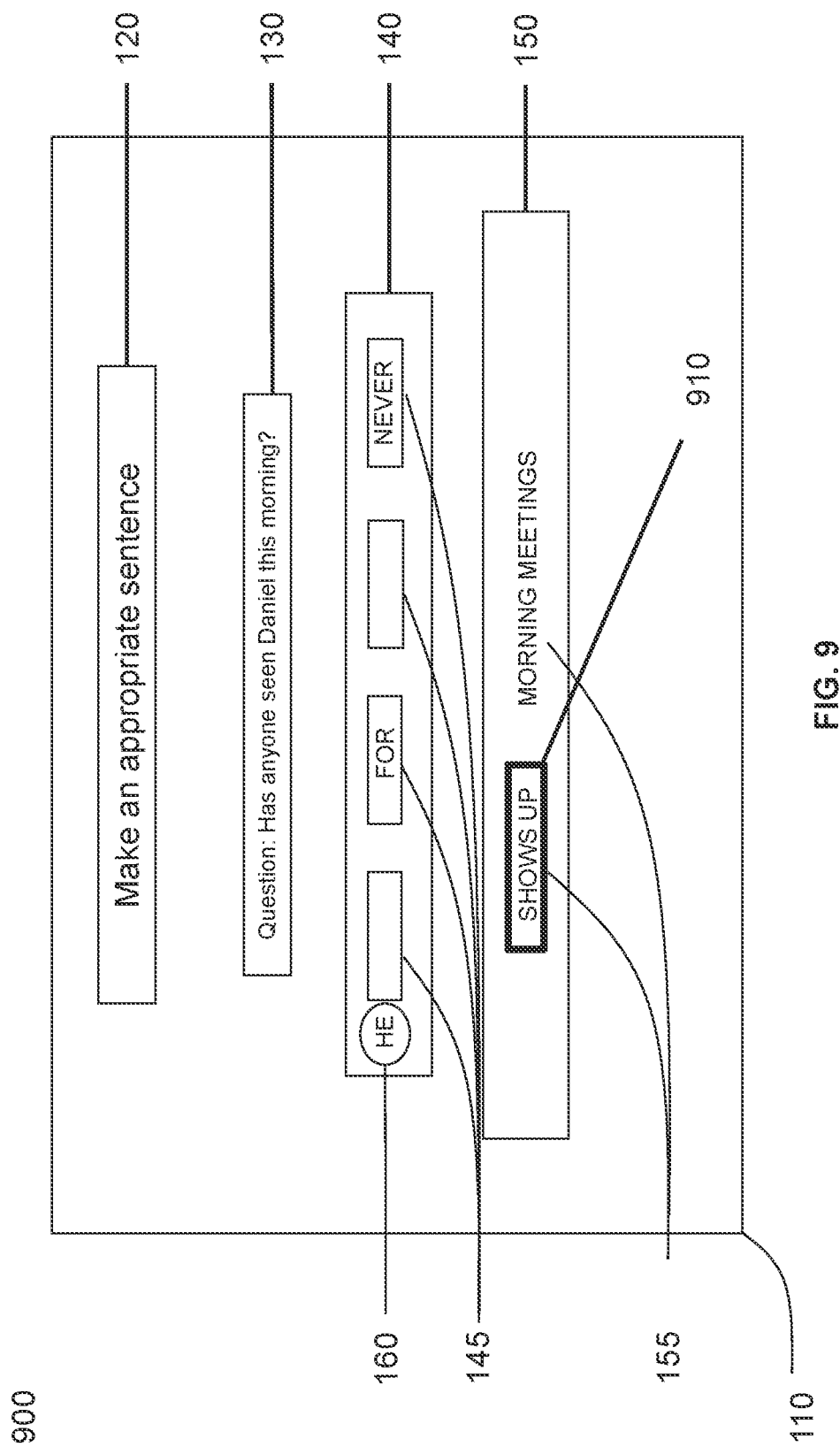
FIGS. 9-12 depict an ordered interaction task in various states according to a third aspect.
Figure 10:
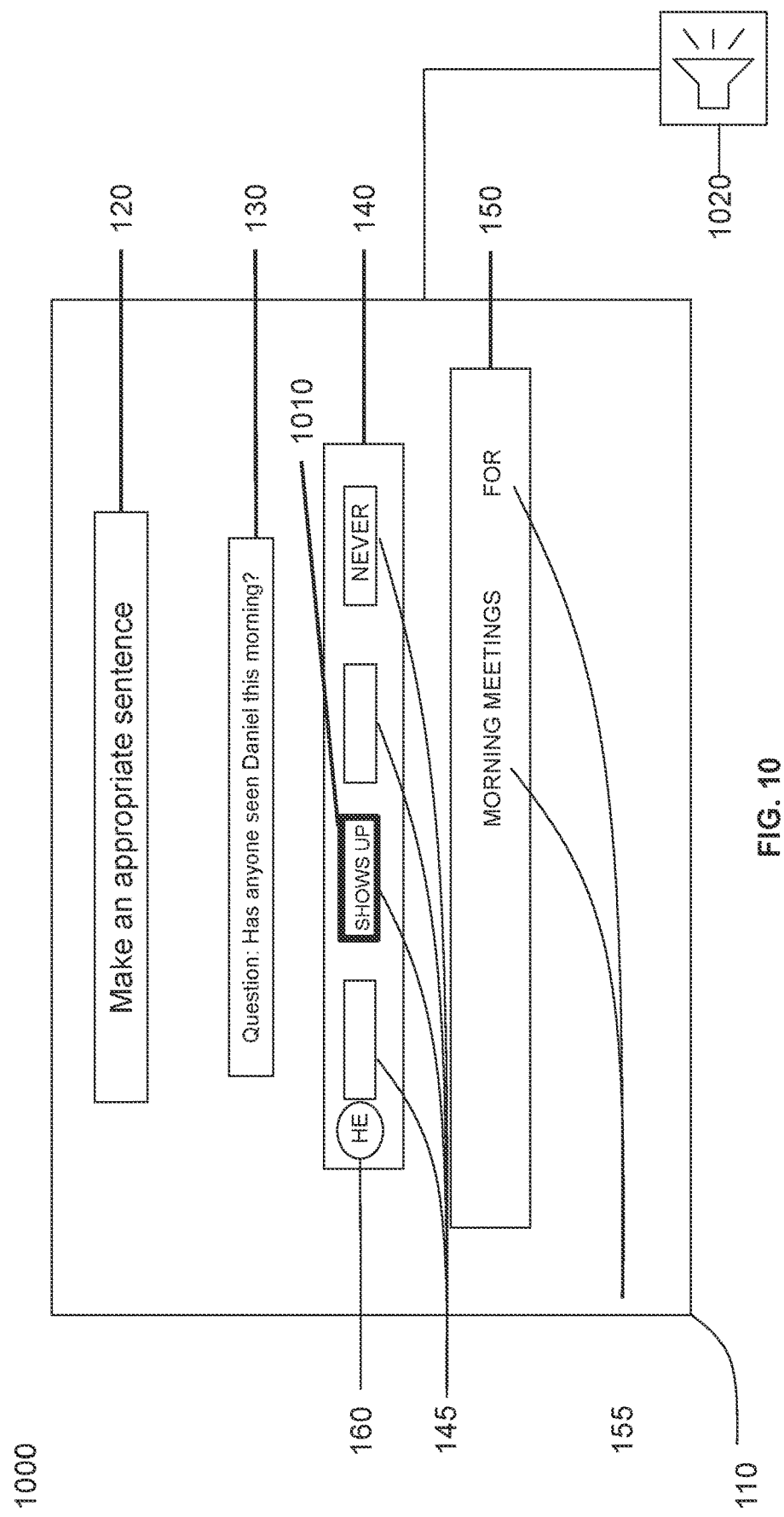

FIGS. 9-12 depict another feature of the methods and systems described herein in which an element within a filled blank may be replaced with another element from the choice region or from a different filled blank. FIG. 9 depicts an exemplary ordered interaction task in a state 900. In this state, the element "for" has been placed in blank two, and the element "never" has been placed in blank four. The user has further selected the element "shows up" as indicated by the highlighted box 910. After selecting this element, the user can then navigate back to blank two and replace the element therein with the selected element "shows up." The state 1000 following this action is depicted in FIG. 10. As shown in FIG. 10, the element "shows up" now occupies blank two, while the element "for" is returned to the choice region 150. After the replacement, the user receives a non-visual presentation 1020 describing the action. Here, the user hears the phrase "shows up inserted in blank two, for returned to the choice region."

Figure 11:
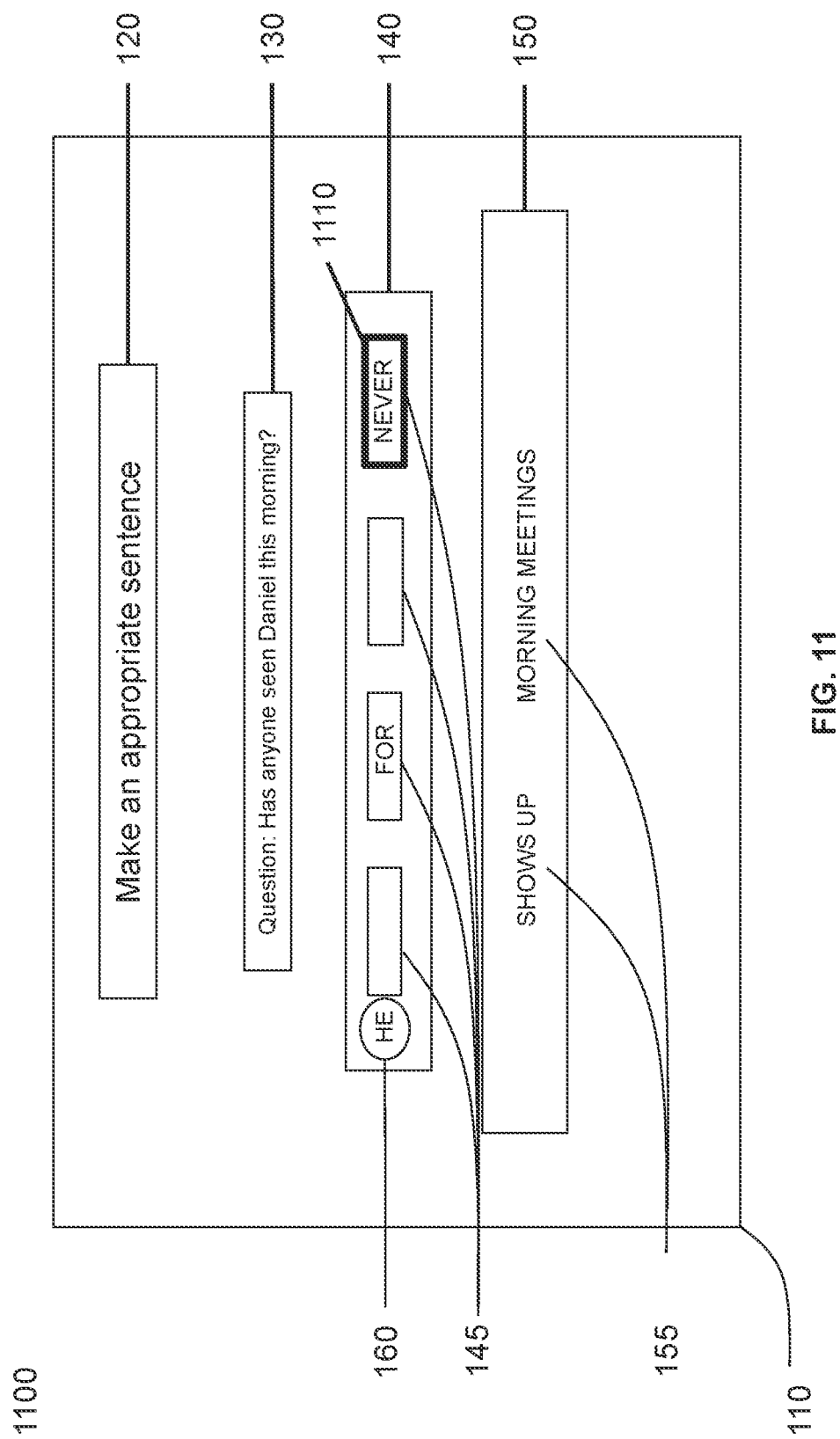
Figure 12:
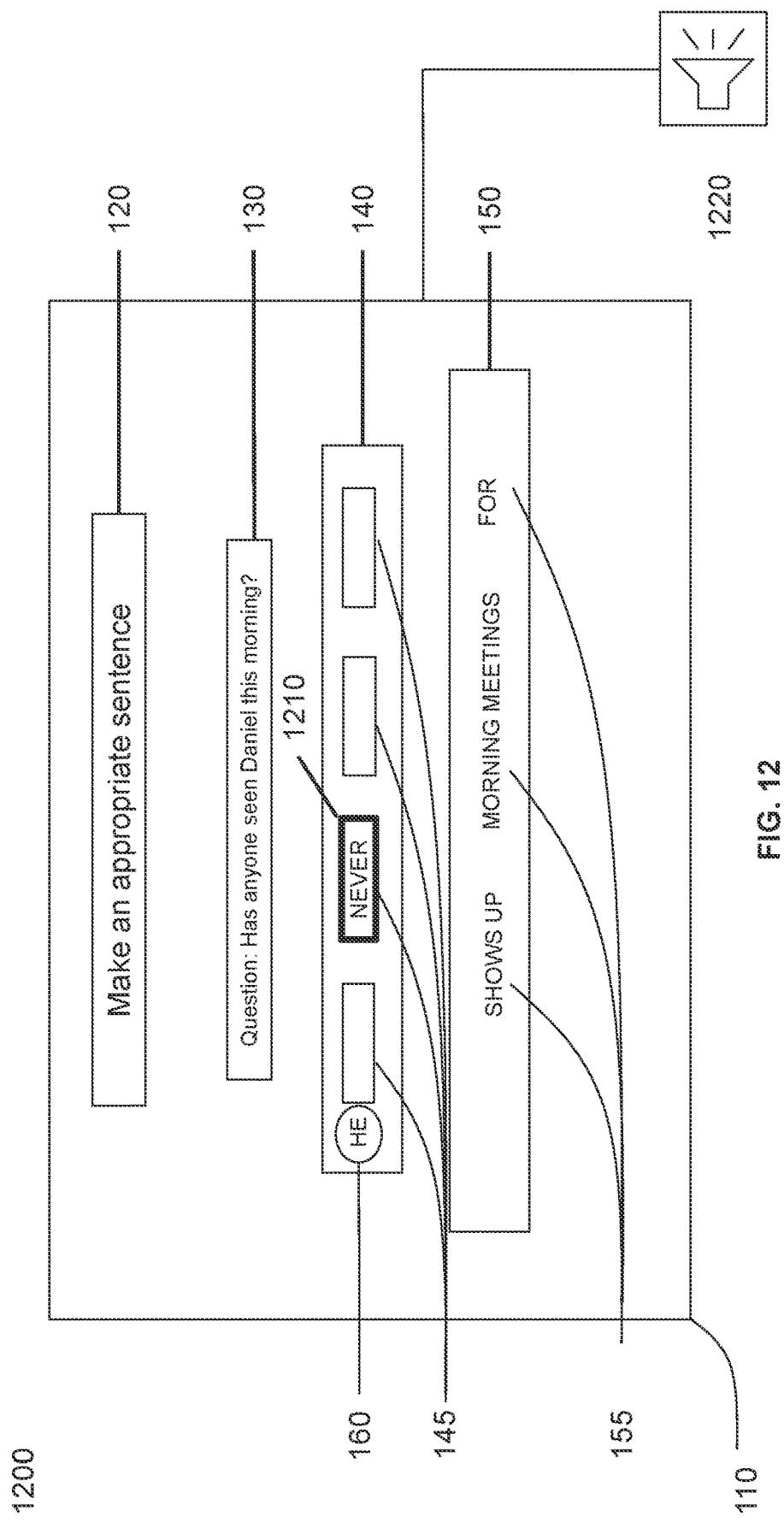

FIGS. 11-12 depict a similar functionality, but in this example an element of a first filled blank replaces an element of a second filled blank. FIG. 11 shows a state 1100 that is similar to that shown in FIG. 9, except here the element never is selected, as depicted by the highlighted box 1110. After selecting this element, the user can then navigate back to blank two and replace the element therein with the selected element "never." The state 1200 following this action is depicted in FIG. 12. As shown in FIG. 12, the element "never" now occupies blank two, while the element "for" is returned to the choice region 150. After the replacement, the user receives a non-visual presentation 1220 describing the action. Here, the user hears the phrase "never inserted in blank two, for returned to the choice region."

Figure 13:
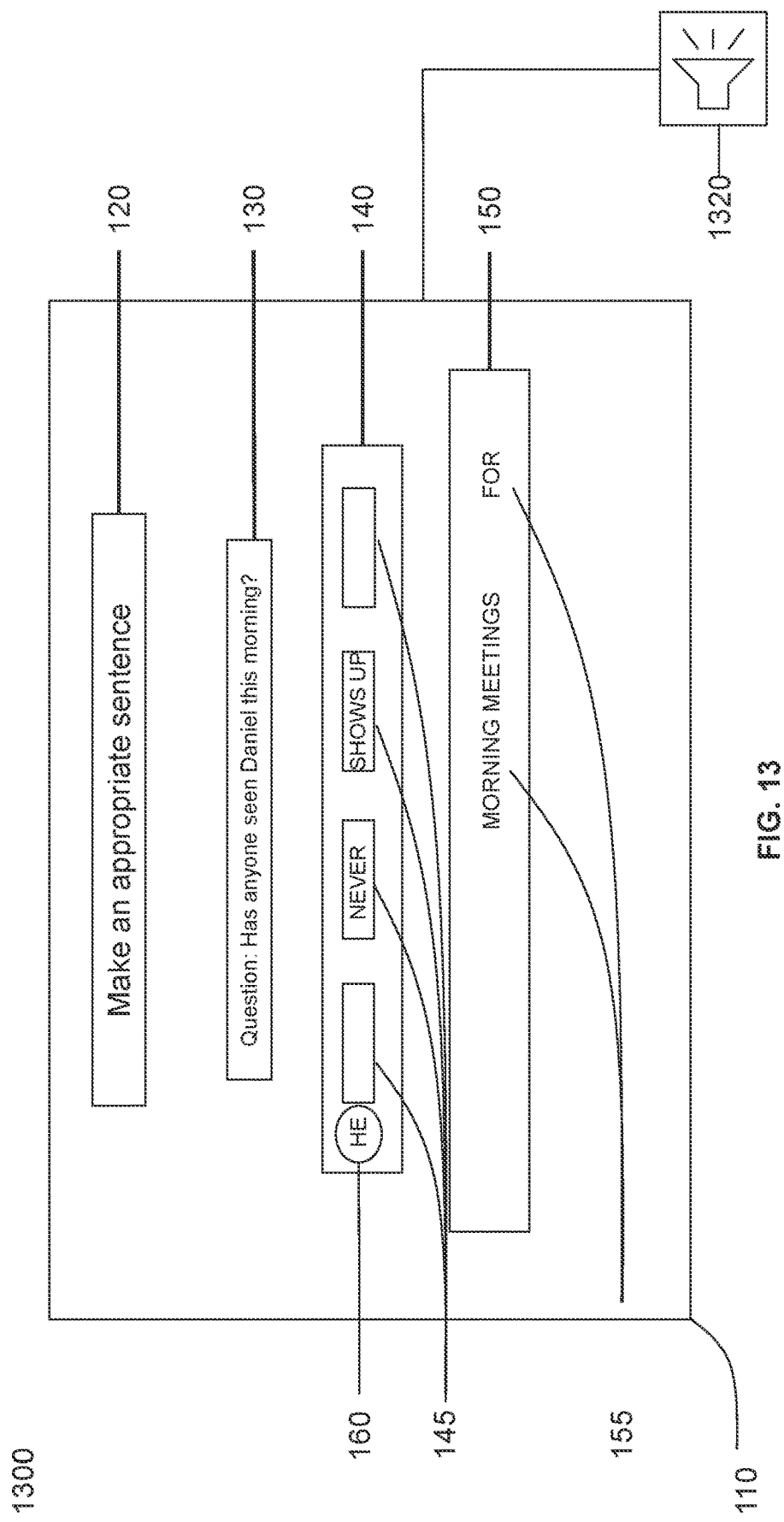
FIGS. 13-14 depict an ordered interaction task in additional states according to a fourth aspect.

An additional feature of the methods and systems described herein is that the status of the task to be completed can be accessed and presented at any time. For example, FIG. 13 depicts the GUI showing the ordered interaction task in an additional state 1300. In this state, the user has filled the element "never" into the second blank and the element "shows up" into the third blank. By inputting a specific user-initiated command, for example by inputting the command Ctrl+Shift+S, the user can receive a non-visual presentation 1320 of the status of the sentence. This includes non-visual presentation of the static text, the blanks, and any elements that have been filled. Here, the user would hear the phrase "he, blank one, never, shows up, blank four."

Figure 14:
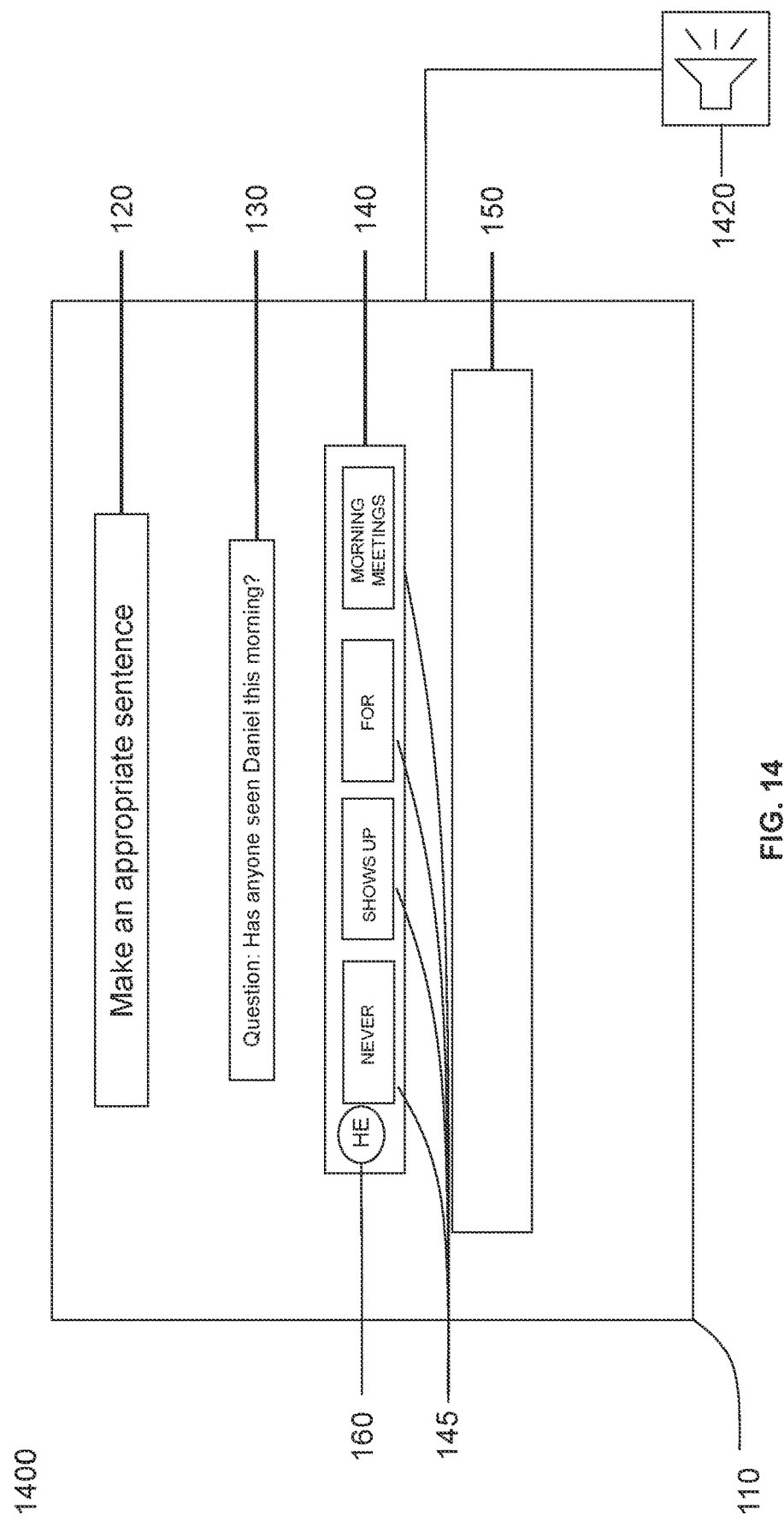

FIG. 14 depicts the GUI showing the ordered interaction in an additional state 1400. In this case, all elements of the choice region 150 have been placed into blanks 145. By inputting the specific user-initiated command discussed above, the user can receive a non-visual presentation 1420 of the status of the sentence. In this case, the user would hear the completed sentence, "he never shows up for morning meetings."

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random-access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   initiating, in a graphical user interface, an ordered interaction task configurable to be completed by a visually-impaired user, wherein the interaction task is linearly-ordered along either a horizontal axis or a vertical axis of the graphical user interface;
   segmenting a main region of the graphical user interface into a plurality of discrete sub-regions arranged along the vertical axis, the plurality of discrete sub-regions comprising content of the ordered interaction task arranged along a plurality of horizontal lines that are parallel to the horizontal axis;
   wherein each sub-region comprises a portion of the content of the ordered interaction task;
   wherein the arrangement of sub-regions along the vertical axis is perpendicular to the plurality of horizontal lines;
   wherein the visually-impaired user can navigate up, down, and across the plurality of horizontal lines of the graphical user interface;
   prompting the user to begin the ordered interaction task by providing, concurrently with the graphical user interface, a first non-visual presentation; and
   providing, concurrently with the graphical user interface, a second non-visual presentation of at least a portion of the content of at least one sub-region to orient the user within the graphical user interface in response to a user-initiated command received in the graphical user interface;
   wherein the plurality of sub-regions includes at least a response sub-region comprising a choice sub-region and a target sub-region, the response sub-region comprising a plurality of elements to be placed in order by the user, wherein each element has a visual aspect and a non-visual aspect, as well as a plurality of blanks that are capable of being in either a filled state or an un-filled state;
   wherein a third non-visual presentation indicates a numerical position of the blanks, and a fourth non-visual presentation indicates the state that the blanks are in;
   implementing at least one of the following actions in response to additional user-initiated commands, wherein the additional user-initiated commands are visual based or non-visual based:
      elements of the choice sub-region are moved from the choice sub-region into un-filled blanks of the target sub-region to create filled blanks;
      elements of filled blanks of the target sub-region are moved into the choice sub-region to create un-filled blanks; and
      elements of filled blanks are replaced by elements of the choice sub-region or of other filled blanks.

2. The method of claim 1, wherein:
   the plurality of sub-regions further includes at least a directions sub-region and a question sub-region.

3. The method of claim 1, wherein the ordered interaction task requires the user to place the elements into a unidirectional, specified order, and comprises at least one of the following: a sentence completion task, a timeline completion task, or a mathematical operation task.

4. The method of claim 1, wherein a fifth non-visual presentation indicates a numerical position of the elements.

5. The method of claim 1, wherein the ordered interaction task is a sentence completion task in which the elements of the choice sub-region are words that make up a sentence to be complete, and the blanks of the target sub-region represent positions of the words within the sentence, the method further comprising:
   providing, concurrently with the graphical user interface, a fifth non-visual presentation in response to the additional user-initiated commands, wherein the fifth non-visual presentation comprises non-visual presentation of a status of the sentence, wherein the status of the sentence can be accessed and presented at any time.

6. A computer-implemented system for providing an ordered interaction task, the system comprising:

a processor; and a computer-readable memory in communication with the processor encoded with instructions for commanding the processor to execute steps comprising:

initiating, in a main region of a graphical user interface, the ordered interaction task comprising content of the ordered interaction task and that is configurable to be completed by a visually-impaired user;

wherein the main region of the graphical user interface is configurable to be segmented into a plurality of discrete sub-regions arranged into a vertical sequence, the plurality of discrete sub-regions comprising:

the content of the ordered interaction task, the content comprising static text, blanks, and elements; and a plurality of horizontal lines;

wherein each discrete sub-region comprises a portion of the content of the ordered interaction task;

wherein the static text, the blanks, and the elements are arranged along the plurality of horizontal lines;

wherein the vertical sequence is perpendicular to the plurality of horizontal lines;

wherein the user can, using a keyboard operatively connected to the graphic user interface, navigate up and down to each horizontal line within each discrete sub-region, and, using the keyboard, navigate left and right to the static text, the blanks, and the elements along the plurality of horizontal lines;

providing a plurality of non-visual presentations to orient the user within the graphical user interface in response to user-initiated commands received in the graphical user interface wherein the plurality of discrete sub-regions includes at least a response sub-region comprising a choice sub-region and a target sub-region;

wherein the elements are to be placed in order by the user, and wherein the blanks are capable of being in either a filled state or an un-filled state;

wherein a first non-visual presentation of the plurality of non-visual presentations indicates a numerical position of the blanks, and a second non-visual presentation indicates the state that the blanks are in;

implementing at least one of the following actions in response to the user-initiated command:

elements of the choice sub-region are moved from the choice sub-region into un-filled blanks of the target sub-region to create filled blanks;

elements of filled blanks of the target sub-region are moved into the choice sub-region to create un-filled blanks; and elements of filled blanks are replaced by elements of the choice sub-region or of other filled blanks;

wherein a third non-visual presentation describing the at least one implemented action is provided to the user.

7. The system of claim 6, wherein the plurality of discrete sub-regions further comprises a directions sub-region and a question sub-region.

8. The system of claim 7, wherein the graphical user interface is configurable to not visually display the content of the question region to visually-impaired users.

9. The system of claim 6, wherein the third non-visual presentation indicates a numerical position of the elements.

10. The system of claim 6, wherein the ordered interaction task is a sentence completion task in which the elements of the choice sub-region comprise words that make up a sentence to be completed, and the blanks of the target sub-region represent positions of the words within the sentence, the method further comprising:

providing, concurrently with the graphical user interface, a fourth non-visual presentation in response to the user-initiated commands, wherein the fourth non-visual presentation comprises non-visual presentation of a status of the sentence, wherein the status of the sentence can be accessed and presented at any time.

11. The system of claim 6, wherein the main region of the graphical user interface is configurable to be segmented by assigning an ARIA landmark role to each sub-region such that each sub-region is identifiable as significant and subsequently configured to be readily discoverable and navigable.

12. The system of claim 6, wherein each of the static text, the blanks, and the elements has a visual aspect and a non-visual aspect.

13. The system of claim 12, wherein the non-visual aspects of the static text, the blanks, or the elements are presented to the user either upon navigating to the static text, the blanks, or the elements, or upon navigating to and selecting the static text, the blanks, or the elements.

14. The system of claim 6, wherein the elements of filled blanks that are replaced are automatically returned to their original position in the choice sub-region.

15. The system of claim 6, wherein a keyboard key used to input the user-initiated commands triggers different actions depending on:

user-initiated commands that were previously input;

the identity of one or more static texts, blanks, elements, or a combination thereof being acted upon; or a combination thereof.

16. The system of claim 6, wherein a plurality of ordered interaction tasks are segmented into pluralities of discrete sub-regions arranged into vertical sequences such that navigating the plurality of ordered interaction tasks is uniform and predictable for a visually-impaired user.

17. The system of claim 6, wherein the choice sub-region and the target sub-region are adjacent within the vertical sequence so as to reduce the amount of navigation required by the visually-impaired user to complete the ordered interaction task.

18. The system of claim 6, wherein the elements comprise short phrases.

19. The system of claim 6, wherein the ordered interaction task requires the user to place the elements into a unidirectional, specified order, and comprises at least one of the following: a sentence completion task, a timeline completion task, or a mathematical operation task.

20. The system of claim 6, the steps further comprising capturing attributes of the graphical user interface using a screen reader, wherein at least one of the non-visual presentations are provided via the screen reader.

21. A computer-implemented method for providing a sentence completion task, the method comprising:

initiating the sentence completion task in a main region of a graphical user interface of the computer, wherein the sentence completion task comprises content comprising static text, blanks representing positions of missing words in the sentence to be completed, and candidate words;

segmenting the main region of the graphical user interface into a plurality of discrete sub-regions, wherein the plurality of discrete sub-regions comprises:

a plurality of horizontal lines;

the content of the sentence completion task, wherein the static text, the blanks, and the candidate words are arranged along the plurality of horizontal lines; and at least a directions sub-region, a question sub-region, and a response sub-region comprising a choice sub-region and a target sub-region;
wherein the plurality of discrete sub-regions form a vertical sequence that is perpendicular to the plurality of horizontal lines;
wherein the response sub-region further comprises the blanks and the candidate words, wherein at least each candidate word has a visual and non-visual aspect; and
wherein each of the blanks is capable of being in either a filled state or an un-filled state;
prompting a visually-impaired user to begin the sentence completion task by providing, concurrently with the graphical user interface, a first non-visual presentation;
wherein the visually-impaired user can, using a keyboard operatively connected to the graphical user interface, navigate up and down to each horizontal line of the plurality of horizontal lines, and, using the keyboard, navigate left and right to the static text, the blanks, and the candidate words along the plurality of horizontal lines;
wherein the target region and the choice region are configured such that, in response to user-initiated commands, a candidate word is moved from the choice region into an un-filled blank of the target region to create a filled blank, words of filled blanks of the target region are moved into the choice region to create an un-filled blank, and words of filled blanks are replaced by candidate words from the choice region or from other filled blanks; and
providing, concurrently with the graphical user interface, a second non-visual presentation of a status of the sentence in response to at least one of the user-initiated commands received by the graphical user interface.

* * * * *